United States Patent
Jikuhara et al.

(10) Patent No.: US 12,456,101 B2
(45) Date of Patent: Oct. 28, 2025

(54) INFORMATION PROCESSING DEVICE, DELIVERY SYSTEM, PROGRAM, AND INFORMATION PROCESSING METHOD

(71) Applicant: TOYOTA JIDOSHA KABUSHIKI KAISHA, Aichi-ken (JP)

(72) Inventors: Yoshikazu Jikuhara, Miyoshi (JP); Jun Hioki, Nagakute (JP); Kaori Yamada, Nagakute (JP); Maiko Watanabe, Nagoya (JP); Yuki Kuwayama, Yokohama (JP); Shunya Maruta, Tokyo (JP); Yo Okumura, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 256 days.

(21) Appl. No.: 18/344,784

(22) Filed: Jun. 29, 2023

(65) Prior Publication Data
US 2024/0013163 A1 Jan. 11, 2024

(30) Foreign Application Priority Data
Jul. 5, 2022 (JP) .................. 2022-108607

(51) Int. Cl.
G06Q 10/20 (2023.01)
G06Q 10/083 (2024.01)

(52) U.S. Cl.
CPC ........... *G06Q 10/20* (2013.01); *G06Q 10/083* (2013.01)

(58) Field of Classification Search
CPC ....... G06Q 10/20; G06Q 10/083; G06Q 10/08
See application file for complete search history.

(56) References Cited

U.S. PATENT DOCUMENTS

| | | | |
|---|---|---|---|
| 9,053,588 B1* | 6/2015 | Briggs | G07C 5/006 |
| 10,049,505 B1* | 8/2018 | Harvey | B60R 16/0234 |
| 10,222,798 B1* | 3/2019 | Brady | G05D 1/0297 |
| 2015/0379468 A1 | 12/2015 | Harvey | |
| 2018/0308069 A1* | 10/2018 | Starks | G06Q 10/063116 |
| 2018/0349834 A1* | 12/2018 | Heinla | G06Q 10/08 |
| 2019/0168392 A1* | 6/2019 | Väin | G06Q 10/00 |

(Continued)

FOREIGN PATENT DOCUMENTS

| | | |
|---|---|---|
| DE | 102016009572 A1 | 11/2017 |
| GB | 2573382 A | 11/2019 |

(Continued)

OTHER PUBLICATIONS

Iborra, A., Caceres, D. A., Ortiz, F. J., Franco, J. P., Palma, P. S., & Alvarez, B. (2009). Design of service robots. IEEE Robotics & Automation Magazine, 16(1), 24-33. (Year: 2009).*

(Continued)

*Primary Examiner* — John S. Wasaff
(74) *Attorney, Agent, or Firm* — HAUPTMAN HAM, LLP

(57) ABSTRACT

The information processing device manages a vehicle for package delivery and a logistics robot permanently installed in the apartment house. The information processing device includes a control unit that acquires information on whether maintenance of the logistics robot is necessary from the logistics robot, transmits information on the logistics robot that needs maintenance to the vehicle, and instructs the vehicle to collect the logistics robot that needs maintenance.

11 Claims, 5 Drawing Sheets

(56) References Cited

U.S. PATENT DOCUMENTS

| | | | |
|---|---|---|---|
| 2019/0188635 A1* | 6/2019 | High | G06Q 10/0832 |
| 2020/0219332 A1* | 7/2020 | Shekar | G07C 5/008 |
| 2021/0197702 A1* | 7/2021 | Krishnamurthi | G07C 5/0808 |
| 2022/0092528 A1 | 3/2022 | Kashiwakura et al. | |

FOREIGN PATENT DOCUMENTS

| | | |
|---|---|---|
| JP | 2019-074926 A | 5/2019 |
| JP | 2019-109847 A | 7/2019 |
| JP | 2022-050964 A | 3/2022 |

OTHER PUBLICATIONS

Kocsis, M., Zöllner, R., & Mogan, G. (2022). Interactive system for package delivery in pedestrian areas using a self-developed fleet of autonomous vehicles. Electronics, 11(5), 748. (Year: 2022).*

* cited by examiner

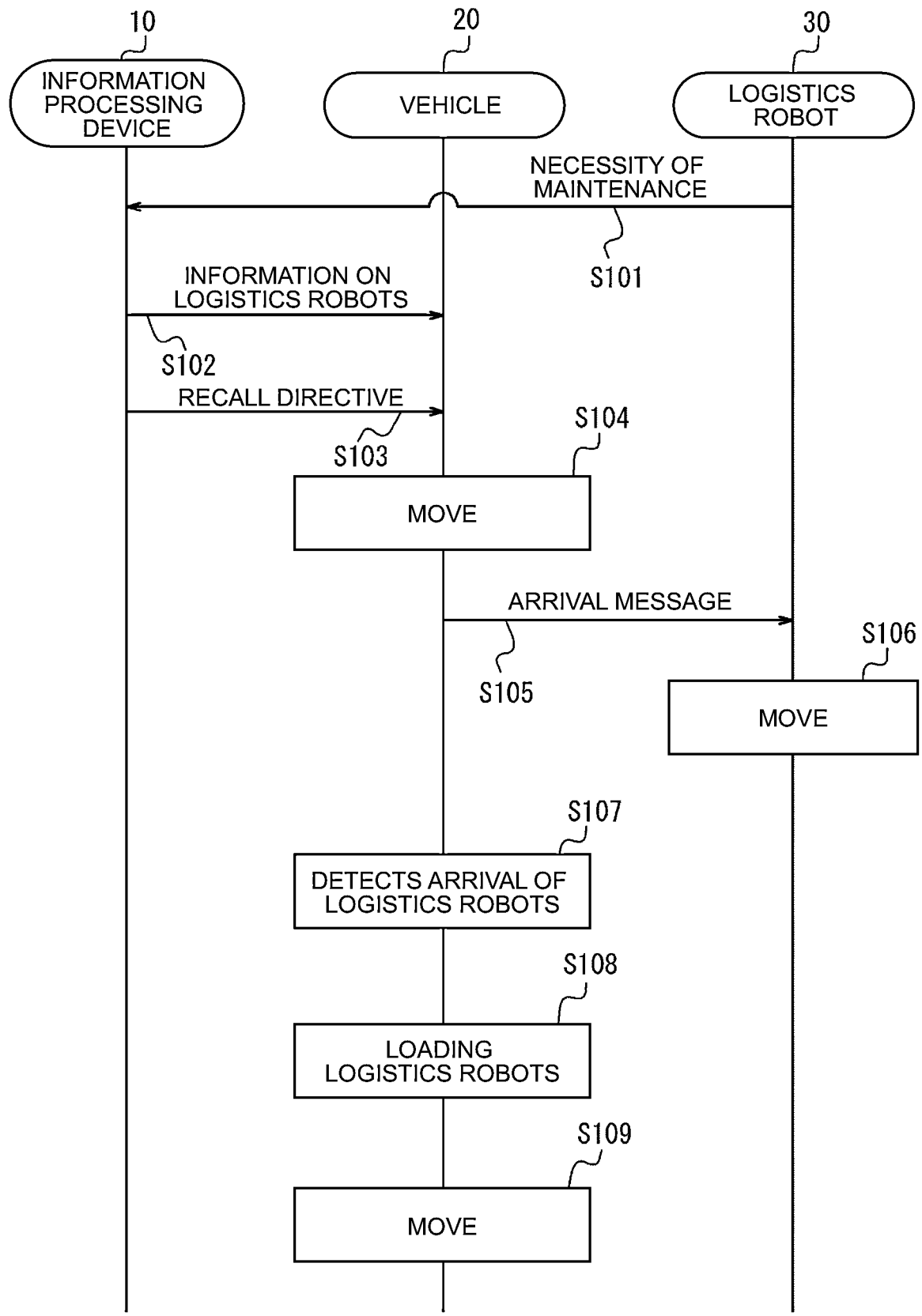

INFORMATION PROCESSING DEVICE, DELIVERY SYSTEM, PROGRAM, AND INFORMATION PROCESSING METHOD

CROSS-REFERENCE TO RELATED APPLICATION

This application claims priority to Japanese Patent Application No. 2022-108607 filed on Jul. 5, 2022 incorporated herein by reference in its entirety.

BACKGROUND

1. Technical Field

The present disclosure relates to an information processing device, a delivery system, a program, and an information processing method.

2. Description of Related Art

In recent years, in the field of logistics, various techniques have been studied for the delivery of a package in a last section from a final base to a delivery destination.

For example, U.S. Patent Application Publication No. 2015/0379468 discloses a technique in which a large delivery vehicle moves to the vicinity of the delivery destination and a small logistics robot delivers a package from near a delivery destination to a final delivery destination. In U.S. Patent Application Publication No. 2015/0379468, a large delivery vehicle carries a small logistics robot along with a package to the vicinity of a delivery destination, and the small logistics robot loaded with the package carries the package from the vicinity of the delivery destination to the delivery destination.

SUMMARY

The logistics robot that finally delivers the package to the delivery destination may be permanently installed in the apartment house, for example, instead of being carried together with the package together by the large delivery vehicle. In this case, if the package is delivered to the vicinity of the apartment house by the large delivery vehicle, the logistics robot permanently installed in the apartment house can execute the delivery to each unit of the apartment house.

When a logistics robot permanently installed in an apartment house malfunctions, maintenance is needed. When maintenance is needed, it is difficult for a management company or the like of the apartment house to perform maintenance. Thus, it is necessary to collect the logistics robot permanently installed in the apartment house and perform maintenance by a robot manufacturer or the like.

When a dedicated vehicle for collecting is dispatched to the apartment house to collect the logistics robot in order to collect the logistics robot permanently installed in the apartment house, it is costly and time-consuming.

An object of the present disclosure is to reduce the cost and time required for maintenance of a logistics robot permanently installed in an apartment house.

An information processing device according to the present disclosure is an information processing device that manages a vehicle for package delivery and a logistics robot permanently installed in an apartment house. The information processing device includes a control unit.

The control unit is configured to:
acquire information on whether maintenance of the logistics robot is necessary from the logistics robot;
transmit information of the logistics robot that needs maintenance to the vehicle; and
instruct the vehicle to collect the logistics robot that needs maintenance.

A delivery system according to the present disclosure includes:
the information processing device;
a vehicle for package delivery; and
a logistics robot permanently installed in an apartment house.

A program according to the present disclosure is configured to cause an information processing device that manages a vehicle for package delivery and a logistics robot that is permanently installed in an apartment house to execute:
acquiring information on whether maintenance of the logistics robot is necessary from the logistics robot;
transmitting information of the logistics robot that needs maintenance to the vehicles; and
instructing the vehicle to collect the logistics robot that needs maintenance.

An information processing method according to the present disclosure is an information processing method for a delivery system including a vehicle for package delivery, a logistics robot that is permanently installed in an apartment house, and an information processing device.

The method includes:
acquiring, by the information processing device, information on whether maintenance of the logistics robot is necessary from the logistics robot;
transmitting, by the information processing device, information of the logistics robot that needs maintenance to the vehicles; and
instructing the vehicle, by the information processing device, to collect the logistics robot that needs maintenance.

According to the present disclosure, it is possible to reduce the cost and time when performing maintenance of a logistics robot permanently installed in an apartment house.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a sequence diagram illustrating an operation of a delivery system according to an embodiment of the present disclosure.

DETAILED DESCRIPTION OF EMBODIMENTS

Hereinafter, an embodiment of the disclosure will be described with reference to the drawings.

Figure 1:
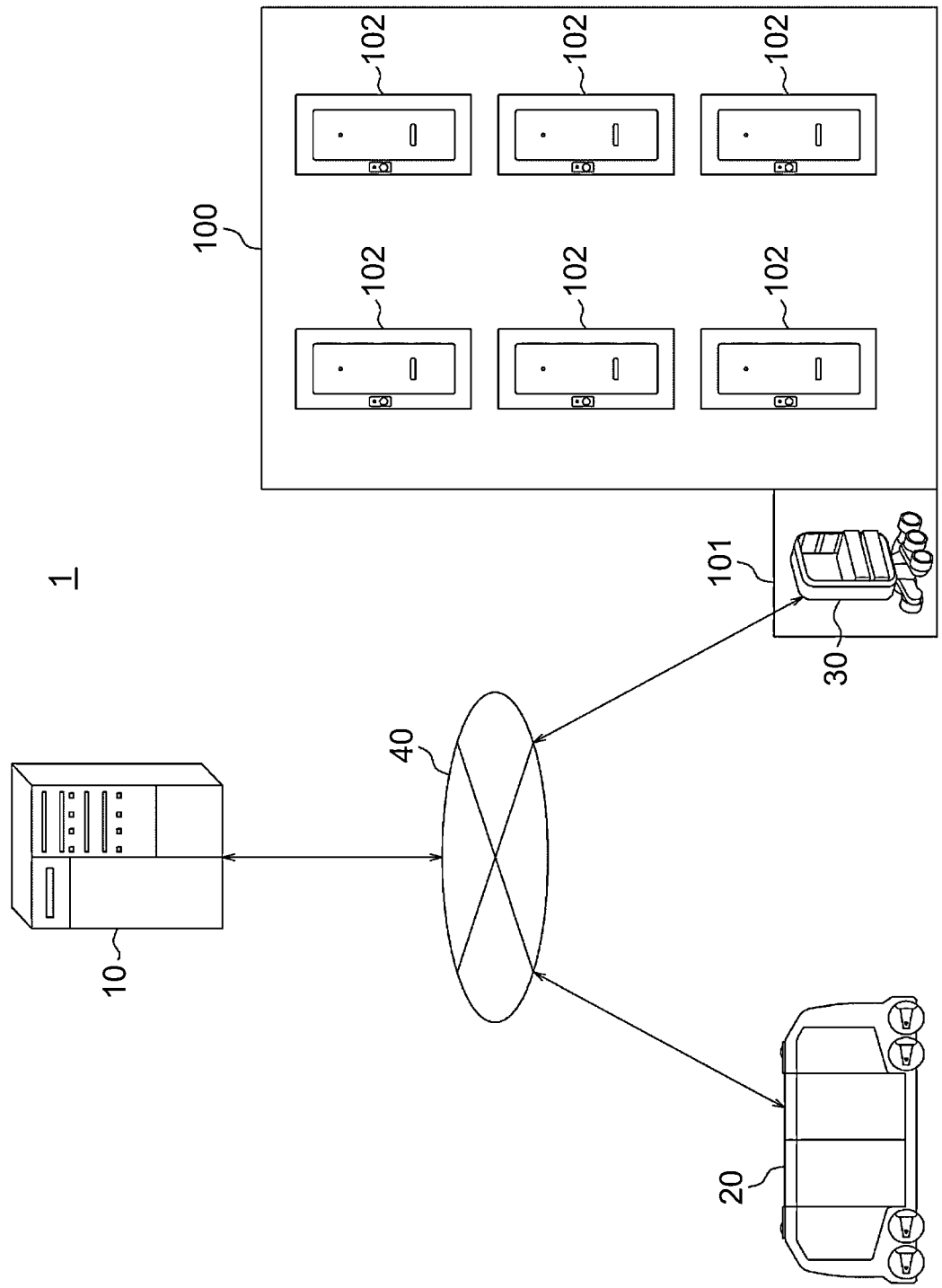
FIG. 1 is a diagram illustrating a configuration of a delivery system according to an embodiment of the present disclosure.

FIG. 1 is a diagram illustrating a configuration of a delivery system 1 according to an embodiment of the present disclosure. With reference to FIG. 1, a configuration and an outline of a delivery system 1 according to an embodiment of the present disclosure will be described.

The delivery system 1 includes an information processing device 10, a vehicle 20, and a logistics robot 30. The information processing device 10, the vehicle 20, and the logistics robot 30 are communicably connected via a network 40. The network 40 may be a network including a mobile communication network and the Internet.

In FIG. 1, one information processing device 10, one vehicle 20, and one logistics robot 30 are illustrated, but two or more information processing devices 10, two or more vehicles 20, and two or more logistics robots 30 may be illustrated.

The apartment house 100 illustrated in FIG. 1 includes a plurality of houses 102. The apartment house 100 has a standby space 101. The logistics robot 30 is permanently installed in the apartment house 100, and normally stands by in the standby space 101.

For example, the information processing device 10 is a dedicated computer configured to function as a server. The information processing device 10 may be a general-purpose Personal Computer (PC).

The information processing device 10 can communicate with the vehicle 20 and the logistics robot 30 via the network 40. The information processing device 10 manages a vehicle 20, which is a vehicle for package delivery, and a logistics robot 30 permanently installed in the apartment house 100.

The vehicle 20 is, for example, an automobile, but is not limited thereto, and may be any vehicle. The vehicle 20 may be, for example, but not limited to, a gasoline-powered vehicle, a Battery Electric Vehicle (BEV, a hybrid-powered vehicle (HEV), a Plug-in Hybrid Electric Vehicle (PHEV, or a Fuel Cell Electric Vehicle (FCEV. In addition, the vehicle 20 may be a manned vehicle or an arbitrary autonomous driving vehicle that travels unmanned.

In the present embodiment, the vehicle 20 is a vehicle for package delivery. When delivering a package to any one of the houses 102 of the apartment house 100, the vehicle 20 travels on a public road and travels toward the vicinity of the apartment house 100. Upon arriving in the vicinity of the apartment house 100, the vehicle 20 delivers the cargo to the logistics robot 30 waiting in the standby space 101 of the apartment house 100. The logistics robot 30 that has delivered the package delivers the package to the house 102 of the delivery destination.

When there is a logistics robot 30 that needs maintenance, the vehicle 20 collects the logistics robot 30 that needs maintenance in the apartment house 100. When the logistics robot 30 is collected, the vehicle 20 transports the collected logistics robot 30 to a facility capable of maintenance of the logistics robot 30.

Logistics robot 30 is a robot that delivers packages autonomously and unattended. The logistics robot 30 may be a vehicle-type robot capable of moving by autonomous driving. The logistics robot 30 is permanently installed in the apartment house 100. The logistics robot 30 normally stands by in the standby space 101 of the apartment house 100. The logistics robot 30 may be an in-hall logistics robot that specializes in delivering a package to each house 102 of the apartment house 100. The logistics robot 30 is not limited to a vehicle-type robot, and may be a humanoid robot or an arbitrary flying object (drone) that flies autonomously.

The logistics robot 30 delivers the package delivered from the vehicle 20 to the house 102. Upon arriving at the delivery-destination house 102, the logistics robot 30 delivers the package to the resident of the delivery-destination house 102.

The logistics robot 30 can self-diagnose whether maintenance is necessary for itself. The logistics robot 30 transmits information on the necessity of maintenance to the information processing device 10.

The information processing device 10 acquires information on the necessity of maintenance from the logistics robot 30. The information processing device 10 transmits information of the logistics robot 30 that needs maintenance to the vehicle 20. The information processing device 10 instructs the vehicle 20 to collect the logistics robot 30 that needs to be maintained. The information processing device 10 instructs the vehicle 20 to carry the collected logistics robot 30 to a facility capable of maintenance of the logistics robot 30.

When the vehicle 20 arrives at the apartment house 100 where the logistics robot 30 requiring maintenance is permanently installed, the logistics robot 30 requiring maintenance is collected. The vehicle 20 carries the collected logistics robot 30 to a facility capable of performing maintenance of the logistics robot 30.

Figure 2:
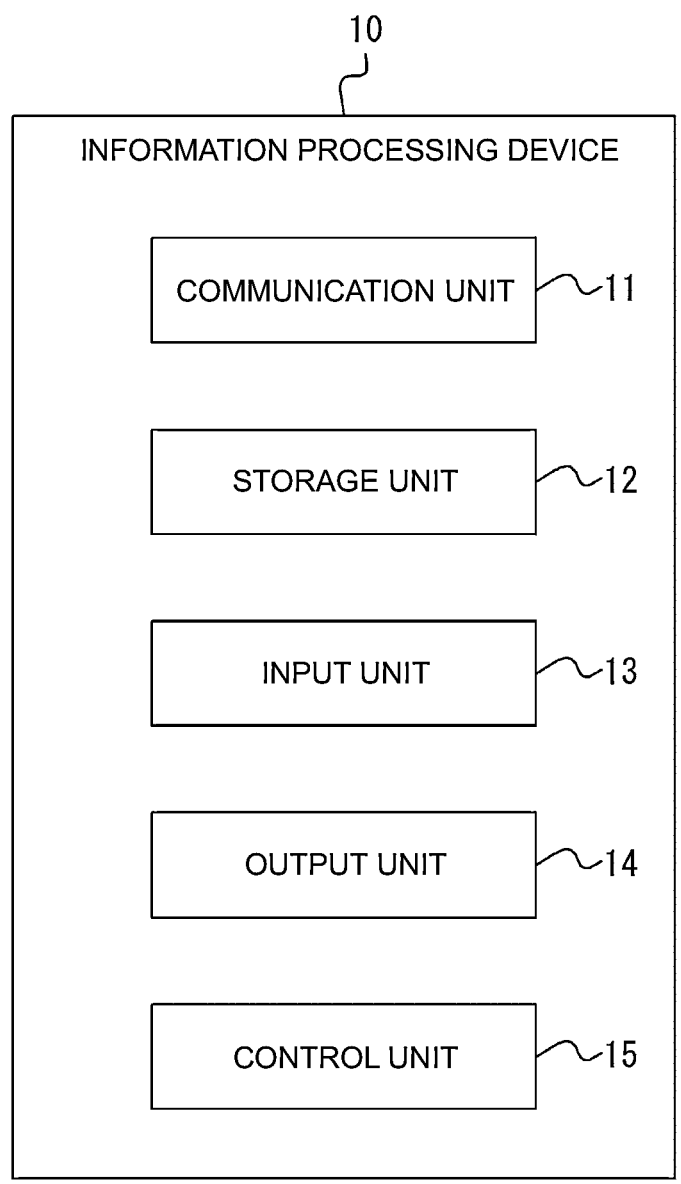
FIG. 2 is a block diagram illustrating a configuration of an information processing device according to an embodiment of the present disclosure.

Next, configurations of the information processing device 10, the vehicle 20, and the logistics robot 30 will be described with reference to FIG. 2 to FIG. 4.

The configuration of the information processing device 10 according to the embodiment of the disclosure will be described with reference to FIG. 2.

The information processing device 10 includes a communication unit 11, a storage unit 12, an input unit 13, an output unit 14 and a control unit 15.

The communication unit 11 includes a communication module connected to the network 40. For example, the communication unit 11 may include a communication module corresponding to Local Area Network (LAN). According to the embodiment, the information processing device 10 is connected to the network 40 via the communication unit 11. The communication unit 11 transmits and receives various types of information via the network 40. The communication unit 11 can communicate with the vehicle 20 and the logistics robot 30 via the network 40.

The storage unit 12 is, for example, a semiconductor memory, a magnetic memory, or an optical memory. However, the storage unit 12 is not limited to these memories. The storage unit 12 may function as, for example, a main storage device, an auxiliary storage device, or a cache memory. The storage unit 12 stores any information used for the operation of the information processing device 10. For example, the storage unit 12 may store a system program, an application program, and various types of information received by the communication unit 11. The information stored in the storage unit 12 may be updatable with information received from the network 40 via the communication unit 11, for example. A part of the storage unit 12 may be installed in the exterior of the information processing device 10. In that case, the part of the storage unit 12 that is installed in the exterior may be connected to the information processing device 10 through an arbitrary interface.

The input unit 13 includes one or more input interfaces that detect a user input and acquire input information based on an operation by a user. Examples of the input unit 13 include a physical key, a static capacitance key, a touch screen provided integrally with a display monitor of the output unit 14, and a microphone that accepts a voice input, but are not limited to them.

The output unit 14 includes one or more output interfaces that output information and give notice to the user. For example, the output unit 14 includes, but is not limited to, a display for outputting information in an image, a speaker for outputting information in a sound, and the like.

The control unit 15 includes at least one processor, at least one dedicated circuit, or a combination of a processor and a dedicated circuit. A processor is a general-purpose processor such as Central Processing Unit (CPU) or Graphics Processing Unit (GPU), or a special-purpose processor specialized for a particular process. The dedicated circuitry is, for example, Field-Programmable Gate Array (FPGA) or Application Specific Integrated Circuit (ASIC). The control unit 15 executes processes about the behavior of the information processing device 10, while controlling each unit of the information processing device 10.

Figure 3:
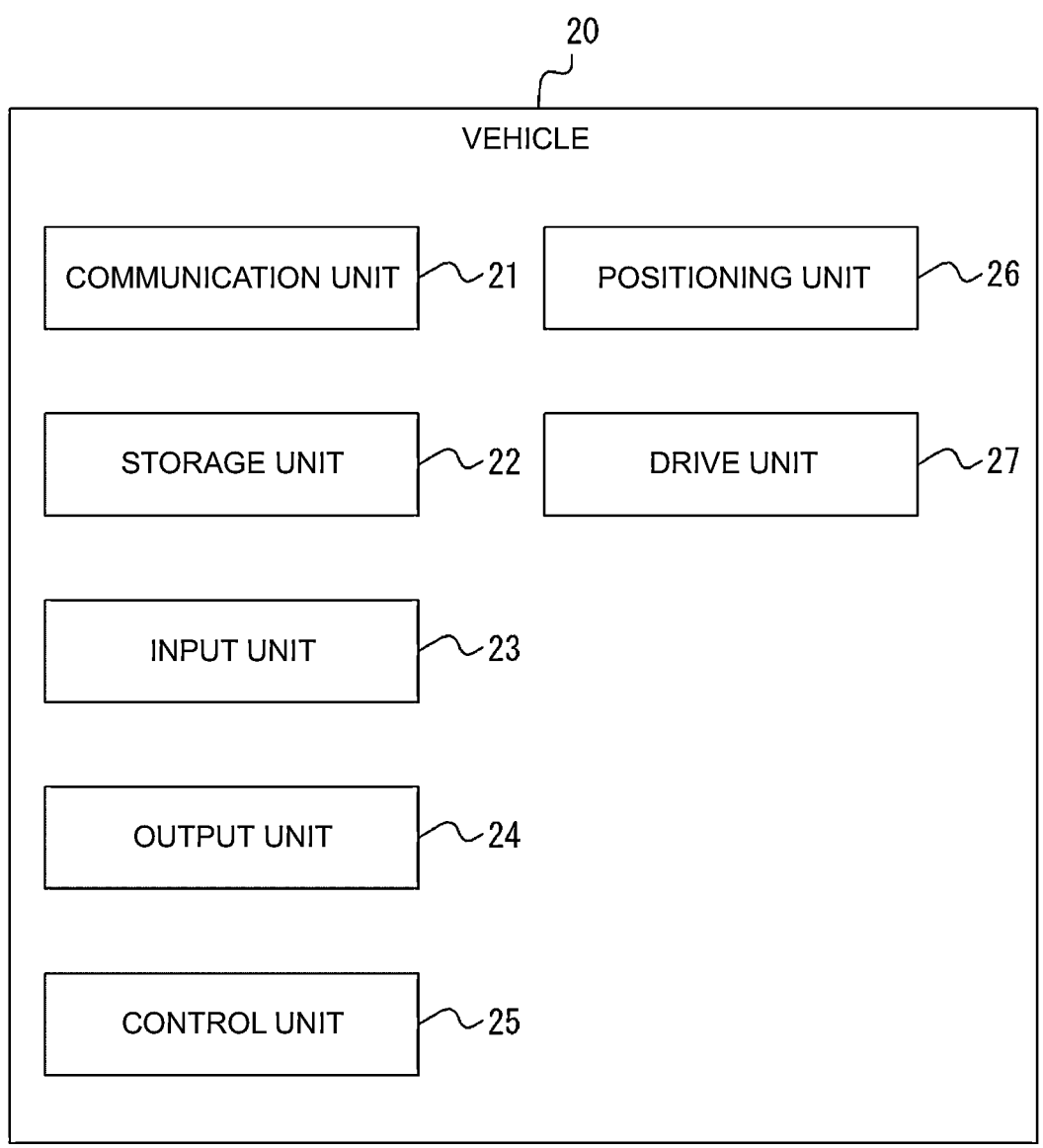
FIG. 3 is a block diagram illustrating a configuration of a vehicle according to an embodiment of the present disclosure.
Figure 4:
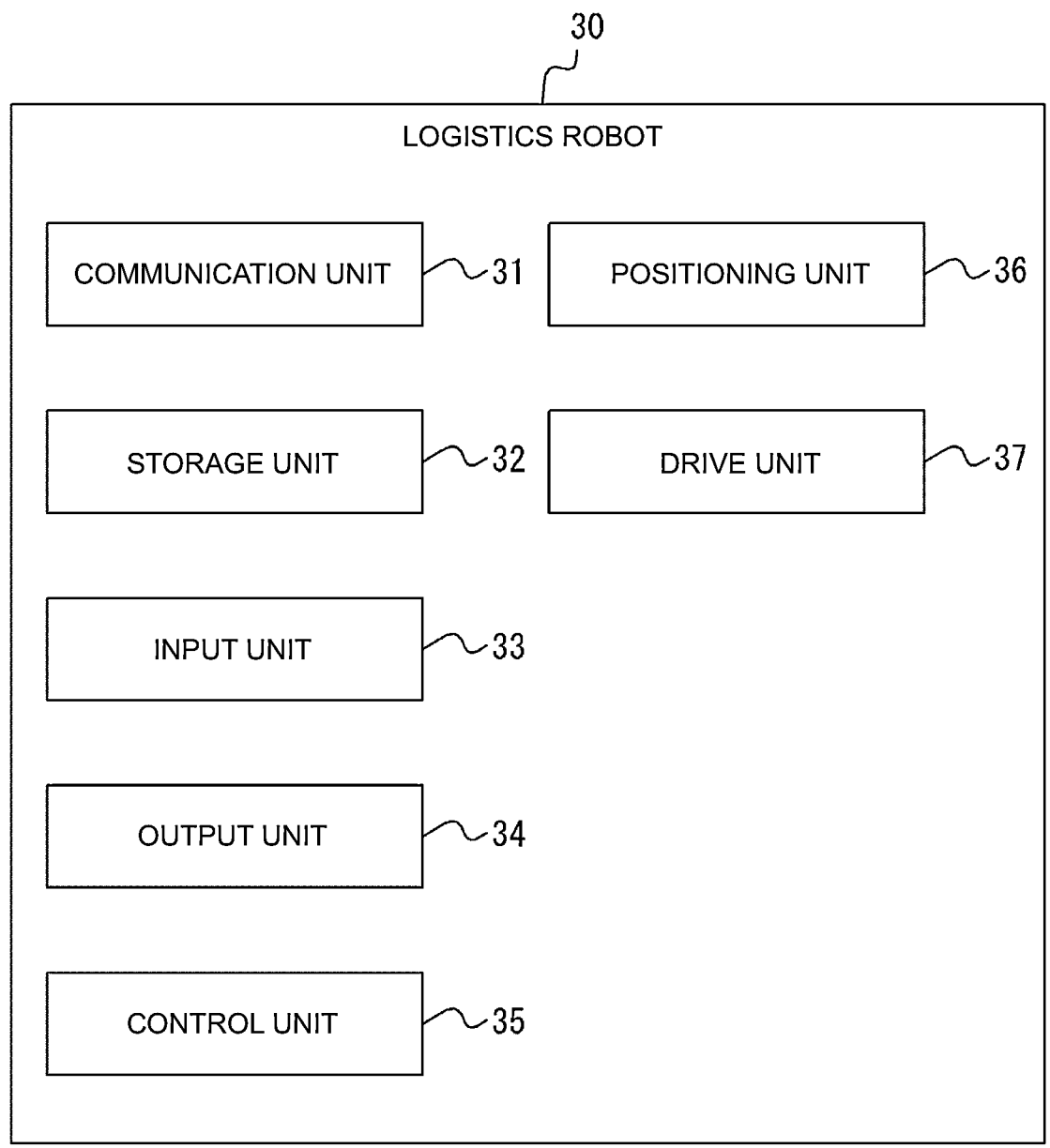
FIG. 4 is a block diagram illustrating a configuration of a logistics robot according to an embodiment of the present disclosure.

Referring to FIG. 3, a configuration of the vehicle 20 according to the embodiment of the present disclosure will be described.

The vehicle 20 includes a communication unit 21, a storage unit 22, an input unit 23, an output unit 24, a control unit 25, a positioning unit 26, and a drive unit 27.

The communication unit 21 includes a communication module connected to the network 40. For example, the communication unit 21 may include a communication module corresponding to a mobile communication standard such as Long Term Evolution (LTE), 4$^{th}$ Generation (4G), and 5$^{th}$ Generation (5G). According to the embodiment, the vehicle 20 is connected to the network 40 via the communication unit 21. The communication unit 21 transmits and receives various types of information via the network 40. The communication unit 21 can communicate with the information processing device 10 and the logistics robot 30 via the network 40.

The storage unit 22 is, for example, a semiconductor memory, a magnetic memory, or an optical memory. However, the storage unit 22 is not limited to these memories. The storage unit 22 may function as, for example, a main storage device, an auxiliary storage device, or a cache memory. The storage unit 22 stores any information used for the operation of the vehicle 20. For example, the storage unit 22 may store a system program, an application program, a variety of information received by the communication unit 21, and the like. The information stored in the storage unit 22 may be updatable with information received from the network 40 via the communication unit 21, for example.

The input unit 23 includes an input unit for inputting information to the vehicle 20. For example, the input unit 23 includes an arbitrary imaging module capable of imaging the surroundings of the vehicle 20. The imaging module includes one or more cameras, each of which is positioned at an appropriate position of the vehicle 20 to enable imaging of the surroundings of the vehicle 20. The input unit 23 may include a voice recognition function together with a voice information input unit. Without being limited thereto, the input unit 23 may include any means for acquiring information about the surroundings of the vehicle 20.

The output unit 24 includes at least one output interface. The output interface is, for example, a display for outputting information in video, a speaker for outputting information in audio, or the like. The display is, for example, a Liquid Crystal Display (LCD) or an organic Electro Luminescence display. The output unit 24 displays and outputs data received from the information processing device 10, data obtained by the operation of the vehicle 20, and the like.

The control unit 25 includes at least one processor, at least one dedicated circuit, or a combination of a processor and a dedicated circuit. The processor is a general-purpose processor such as a CPU or a GPU, or a dedicated processor specialized for a specific process. The dedicated circuit is, for example, an FPGA or an ASIC. The control unit 25 executes processing related to the operation of the vehicle 20 while controlling each unit of the vehicle 20.

The positioning unit 26 includes one or more devices that acquire position information of the vehicle 20. Specifically, the positioning unit 26 includes a receiver corresponding to Global Positioning System (GPS, for example, but is not limited thereto, and may include a receiver corresponding to any satellite-based positioning system. The positioning unit 26 may constantly acquire the position information of the vehicle 20, or may periodically or non-periodically acquire the position information.

The drive unit 27 includes a driving mechanism for moving and traveling of the vehicle 20. Further, the drive unit 27 includes an arbitrary drive mechanism that enables loading of a load on the vehicle 20 and transferring of the load loaded on the vehicle 20 to the logistics robot 30. In addition, the drive unit 27 includes any drive mechanism that enables unloading of a load loaded on the vehicle 20 to a designated location. The drive unit 27 also includes any drive mechanism that allows the logistics robot 30 to be loaded into the luggage compartment of the vehicle 20. For example, the drive unit 27 includes at least one of an arm mechanism driven by a motor and a slide mechanism capable of linearly sliding the load and the logistics robot 30.

A configuration of the logistics robot 30 according to the embodiment of the present disclosure will be described with reference to FIG. 4.

The logistics robot 30 includes a communication unit 31, a storage unit 32, an input unit 33, an output unit 34, a control unit 35, a positioning unit 36, and a drive unit 37.

The communication unit 31 includes a communication module connected to the network 40. For example, the communication unit 31 may include a communication module corresponding to a mobile communication standard such as LTE, 4G and 5G. In one embodiment, the logistics robot 30 is connected to the network 40 via the communication unit 31. The communication unit 31 transmits and receives various types of information via the network 40. The communication unit 31 is capable of communicating with the information processing device 10 and the vehicle 20 via the network 40.

The storage unit 32 is, for example, a semiconductor memory, a magnetic memory, or an optical memory. However, the storage unit 32 is not limited to these memories. The storage unit 32 may function as, for example, a main storage device, an auxiliary storage device, or a cache memory. The storage unit 32 stores arbitrary information used for the operation of the logistics robot 30. For example, the storage unit 32 may store a system program, an application program, and various types of information received by the communication unit 31. The information stored in the storage unit 32 may be updatable with information received from the network 40 via the communication unit 31, for example.

The input unit 33 includes a means for inputting information to the logistics robot 30. For example, the input unit 33 includes an arbitrary imaging module capable of imaging the surroundings of the logistics robot 30. The imaging module includes one or more cameras. Each camera is arranged at an appropriate position of the logistics robot 30 so as to be able to image the periphery of the logistics robot 30. Further, the imaging module preferably includes a function of reading a display of a delivery destination attached to the package. The input unit 33 may include a voice recognition function together with a voice information input unit. Without being limited to this, the input unit 33 may include any means for acquiring information around the logistics robot 30.

The output unit 34 includes at least one output interface. The output interface is, for example, a display for outputting information in video, a speaker for outputting information in audio, or the like. The display is, for example, an LCD or an organic EL display. The output unit 34 displays data received from the information processing device 10, data stored in the logistics robot 30, data obtained by the operation of the logistics robot 30, or the like, for example, to the user or outputs audio.

The control unit 35 includes at least one processor, at least one dedicated circuit, or a combination thereof. The processor is a general-purpose processor such as a CPU or a GPU, or a dedicated processor specialized for a specific process. The dedicated circuit is, for example, an FPGA or an ASIC. The control unit 35 executes processing related to the operation of the logistics robot 30 while controlling each unit of the logistics robot 30.

The positioning unit 36 includes one or more devices that acquire position information of the logistics robot 30. Specifically, the positioning unit 36 includes, for example, a receiver corresponding to GPS, but is not limited thereto, and may include a receiver corresponding to any satellite-based positioning system. The positioning unit 36 may constantly acquire the position information of the logistics robot 30, or may periodically or non-periodically acquire the position information.

The drive unit 37 includes a drive mechanism related to movement and travel of the logistics robot 30. Further, the drive unit 37 includes an arbitrary drive mechanism that enables loading of the cargo onto the logistics robot 30 and transfer of the cargo loaded onto the logistics robot 30 to the user. The drive unit 37 includes any drive mechanism that enables the load loaded on the logistics robot 30 to be unloaded to a designated location. For example, the drive unit 37 includes at least one of an arm mechanism driven by a motor and a slide mechanism capable of linearly sliding a load.

Operation of the Delivery System

The operation of the delivery system 1 shown in FIG. 1 will be described with reference to FIG. 1 to FIG. 4.

The vehicle 20 is a vehicle for package delivery. In the present embodiment, it is assumed that the vehicle 20 is an arbitrary autonomous driving vehicle that travels in an unmanned manner.

When the package is delivered to the house 102 of the apartment house 100, the control unit 15 of the information processing device 10 transmits a delivery command of the package to the vehicle 20 via the communication unit 11. The package delivery instruction includes information necessary for delivering the package. For example, the package delivery command may include information such as an address of the house 102 of the delivery destination, a travel route to the apartment house 100 containing the house 102 of the delivery destination, and the like.

The vehicle 20 loaded with the baggage moves to the apartment house 100 when receiving the delivery command of the baggage from the information processing device 10. Upon arriving at the apartment house 100, the vehicle 20 delivers the cargo to the logistics robot 30.

The logistics robot 30 delivers the package delivered from the vehicle 20 to the house 102 of the delivery destination.

The logistics robot 30 may require maintenance due to some trouble or the like. When maintenance is required, the logistics robot 30 needs to be carried to a facility capable of maintenance and maintained.

The control unit 35 of the logistics robot 30 can self-diagnose whether maintenance is necessary for the logistics robot 30. The control unit 35 periodically performs self-diagnosis, and transmits information on whether or not maintenance is necessary to the information processing device 10 via the communication unit 31. The control unit 35 may periodically transmit information indicating whether maintenance is necessary or not, or may transmit information indicating that maintenance is necessary when maintenance is required.

The control unit 15 of the information processing device 10 acquires information on the necessity of maintenance from the logistics robot 30 via the communication unit 11.

When there is a logistics robot 30 requiring maintenance, the control unit 15 transmits information of the logistics robot 30 requiring maintenance to the vehicle 20 via the communication unit 11.

The information of the logistics robot 30 requiring maintenance, which the control unit 15 transmits to the vehicle 20, includes information on the location of the apartment house 100 where the logistics robot 30 is permanently installed, and identification information of the logistics robot 30 requiring maintenance.

The information of the logistics robot 30 requiring maintenance may further include information on a movement route to the apartment house 100 where the logistics robot 30 is permanently installed. Upon receiving the information on the travel route, the vehicle 20 can automatically move to the apartment house 100 where the logistics robot 30 requiring maintenance is permanently installed, based on the acquired information on the travel route.

The control unit 15 instructs the vehicle 20 to collect the logistics robot 30 that needs to be maintained. The control unit 15 may instruct the vehicle 20 to collect the logistics robot 30 that needs to be maintained by transmitting a collection instruction of the logistics robot 30 that needs to be maintained to the vehicle 20 via the communication unit 11. When transmitting the information of the logistics robot 30 requiring maintenance, the control unit 15 may also transmit the recovery command of the logistics robot 30 requiring maintenance to the vehicle 20.

The control unit 15 may transmit the information of the logistics robot 30 requiring maintenance to the vehicle 20 located closest to the apartment house 100 where the logistics robot 30 requiring maintenance is permanently installed among the plurality of vehicles 20 delivering the package. In addition, the control unit 15 may instruct the vehicle 20 to collect the logistics robot 30 that needs to be maintained. Alternatively, the control unit may transmit the information of the logistics robot 30 that needs maintenance to the vehicle 20 that is scheduled to deliver the package to the apartment house 100 in which the logistics robot 30 that needs maintenance is permanently installed among the plurality of vehicles 20 that are delivering the package. In addition, the control unit 15 may instruct the vehicle 20 to collect the logistics robot 30 that needs to be maintained.

The control unit 15 instructs the vehicle 20 to carry the logistics robot 30 requiring maintenance to a facility capable of performing maintenance of the logistics robot 30. The control unit 15 may instruct the vehicle 20 to collect the logistics robot 30 that needs maintenance by transmitting a command to request the vehicle 20 to carry the logistics robot 30 to a facility that can be maintained via the communication unit 11. When transmitting the information of the logistics robot 30 that needs to be maintained, the control unit 15 may also transmit a command requesting that the logistics robot 30 be transported to a facility that can be maintained to the vehicle 20.

When the vehicle 20 receives the recovery command of the logistics robot 30 requiring maintenance from the information processing device 10, it moves to the apartment house 100 where the logistics robot 30 is permanently installed. At this time, the vehicle 20 may autonomously move to the apartment house 100 where the logistics robot 30 requiring maintenance is permanently installed, based on the information on the movement route to the apartment house 100 received from the information processing device 10.

When the control unit 25 of the vehicle 20 arrives at the apartment house 100 where the logistics robot 30 requiring maintenance is permanently installed, it transmits a message indicating that the logistics robot has arrived to the logistics robot 30 requiring maintenance via the communication unit 21. The control unit 25 transmits a message indicating that it has arrived to the logistics robot 30 that can be identified by the identification information of the logistics robot 30 included in the information of the logistics robot 30 that requires maintenance, which is acquired from the information processing device 10.

The message transmitted by the control unit 25 indicating that the vehicle has arrived at the apartment house 100 may include information on a place where the vehicle is stopped.

When the logistics robot 30 receives a message indicating that the vehicle 20 for collecting the logistics robot 30 has arrived at the apartment house 100, it moves to a place where the vehicle 20 is stopped.

The control unit 25 of the vehicle 20 can detect whether or not the logistics robot 30 requiring maintenance has arrived at a place where the vehicle 20 is stopped, for example, by analyzing an image captured by the imaging module included in the input unit 23. Alternatively, the vehicle 20 can detect whether or not the logistics robot 30 has arrived at a place where the vehicle 20 is stopped by acquiring the position information of the logistics robot 30 from the logistics robot 30 that requires maintenance.

When the control unit 25 detects that the logistics robot 30 requiring maintenance has arrived at a place where the vehicle 20 is stopped, it controls the drive unit 27 to automatically load the logistics robot 30 into the luggage compartment of the vehicle 20. At this time, the control unit 25 controls the drive unit 27 to load the logistics robot 30 into an empty space in the luggage compartment of the vehicle 20 where no luggage is placed.

When the logistics robot 30 requiring maintenance is loaded into the luggage compartment of the vehicle 20, the vehicle 20 moves to a facility where maintenance of the logistics robot 30 is possible. The vehicle 20 may move to a facility where the logistics robot can be maintained after all of the packages to be delivered have been delivered. Alternatively, when the facility capable of performing maintenance of the logistics robot 30 is near the delivery route of the package, the vehicle 20 may move to the facility capable of performing maintenance of the logistics robot 30 during delivery of the package.

The operation of the delivery system 1 will be described with reference to the sequence diagram shown in FIG. 5.

Step S101: The logistics robot 30 periodically performs a self-diagnosis as to whether or not maintenance is required, and transmits information as to whether or not maintenance is required to the information processing device 10.

Step S102: When there is a logistics robot 30 that needs maintenance, the information processing device 10 transmits information of the logistics robot 30 that needs maintenance to the vehicle 20.

Step S103: When there is a logistics robot 30 that needs maintenance, the information processing device 10 transmits a recovery command of the logistics robot 30 that needs maintenance to the vehicle 20.

The information processing device 10 may simultaneously execute steps S102 and steps S103. The information processing device 10 may execute the process of the step S102 and the step S103 on the vehicle 20 located closest to the apartment house 100 in which the logistics robot 30 requiring maintenance is permanently installed, among the plurality of vehicles 20 delivering the package.

Step S104: When receiving a recovery command from the information processing device 10 for the logistics robot 30 that needs to be maintained, the vehicle 20 moves to the apartment house 100 where the logistics robot 30 is permanently installed.

Step S105: When the vehicle 20 arrives at the apartment house 100 where the logistics robot 30 requiring maintenance is permanently installed, it transmits a message indicating that the vehicle has arrived to the logistics robot 30 requiring maintenance.

Step S106: When the logistics robot 30 that needs to be maintained receives a message indicating that the vehicle 20 for collecting the logistics robot 30 has arrived at the apartment house 100, the logistics robot moves to a location where the vehicle 20 is stopped.

Step S107: The vehicle 20 detects whether or not the logistics robot 30 that needs to be maintained has arrived at a location where the vehicle 20 is stopped.

Step S108: The vehicle 20 automatically loads the logistics robot 30 into the luggage compartment of the vehicle 20 when the logistics robot 30 that needs to be maintained detects that it has arrived at a location where the vehicle 20 is stopped.

Step S109: When the logistics robot 30 requiring maintenance is loaded into the luggage compartment of the vehicle 20, the vehicle 20 moves to a facility where the logistics robot 30 can be maintained.

As described above, in the information processing device 10 according to the present embodiment, the control unit 15 acquires, from the logistics robot 30, information on the necessity of maintenance of the logistics robot 30. In the information processing device 10 according to the present embodiment, the control unit 15 transmits information of the logistics robot 30 that needs maintenance to the vehicle 20. In the information processing device 10 according to the present embodiment, the control unit 15 instructs the vehicle 20 to collect the logistics robot 30 that requires maintenance. The vehicle 20 that instructs the control unit 15 to collect the logistics robot 30 requiring maintenance is a vehicle for package delivery. Therefore, according to the information processing device 10 of the present embodiment, when there is a logistics robot 30 that requires maintenance, the logistics robot can be collected by the vehicle 20 that is delivering the package without dispatching a vehicle dedicated for collection. Therefore, the information processing device 10 according to the present embodiment can reduce the cost and time when the logistics robot 30 permanently installed in the apartment house 100 is maintained. As described above, since it is possible to reduce the time required for maintenance of the logistics robot 30, the information processing device 10 according to the present embodiment can improve the operation rate of the logistics robot 30 in the apartment house 100.

Further, since the information processing device 10 according to the present embodiment loads the logistics robot 30 requiring maintenance into the free space of the luggage compartment of the vehicle 20 for luggage delivery, the free space of the luggage compartment of the vehicle 20 for luggage delivery can be effectively utilized.

The present disclosure is not limited to the embodiment described above. For example, blocks shown in the block diagram may be integrated, or one block may be divided. Instead of executing the steps shown in the flowcharts in chronological order according to the description, the steps may be executed in parallel or in a different order, depending on the processing capacities of the devices that execute the steps, or as necessary. Other changes may be made without departing from the scope of the present disclosure.

For example, a part of the processing operations executed in the information processing device 10 in the above-described embodiment may be executed in the vehicle 20 or the logistics robot 30. In addition, in the above-described embodiment, some processing operations executed in the vehicle 20 may be executed in the information processing device or the logistics robot 30. In addition, in the above-described embodiment, a part of the processing operations executed by the logistics robot 30 may be executed by the information processing device 10 or the vehicle 20.

For example, a general-purpose electronic device such as a smartphone or a computer may function as the information processing device 10 according to the above embodiment. Specifically, it is conceivable that a program describing processing contents for realizing each function of the information processing device 10 and the like according to the embodiment is stored in a memory of an electronic device, and the program is read and executed by a processor of the electronic device. Thus, the disclosure according to the embodiment can also be realized as the program that can be executed by the processor.

For example, in the above-described embodiment, the case in which the logistics robot 30 is permanently installed in the apartment house 100 has been described as an example, but the facility in which the logistics robot 30 is permanently installed is not limited to the apartment house 100. The logistics robot 30 may be permanently installed in any facility that is an object of delivery of a package.

A part of the embodiment of the present disclosure is shown as an example below. It should be noted, however, that embodiments of the present disclosure are not limited thereto.

Appendix 1

An information processing device for managing a vehicle for package delivery and a logistics robot permanently installed in an apartment house,
  Information on the necessity of maintenance of the logistics robot is acquired from the logistics robot,
  Information of the logistics robot requiring maintenance is transmitted to the vehicle,
  A control unit instructs the vehicle to recover the logistics robot requiring maintenance
  An information processing device comprising:

Appendix 2

In the information processing device described in Appendix 1, an information processing device in which the control unit instructs the vehicle to carry the collected logistics robot to a facility capable of maintenance of the logistics robot.

Appendix 3

In the information processing device according to Appendix 1 or 2, Information of the logistics robot that requires maintenance includes information of the location of the multi-dwelling house where the logistics robot is permanently installed, and the identification information of the logistics robot, information processing device.

Appendix 4

The information processing device according to any one of Appendices 1 to 3,
  an information processing device in which the control unit instructs the vehicle located closest to the apartment house where the logistics robot requiring maintenance is permanently installed to collect the logistics robot.

Appendix 5

An information processing device according to any one of appendices 1 to 4,
  Vehicles for package delivery,
  Logistics robots that are permanently installed in apartment houses,
  A delivery system comprising:

Appendix 6

In the delivery system described in Appendix 5,
  a delivery system in which when the vehicle arrives at an apartment house in which the logistics robot requiring maintenance is permanently installed, the vehicle transmits a message indicating arrival to the logistics robot.

Appendix 7

In the delivery system described in Appendix 6,
  The delivery system, wherein when the logistics robot receives the message indicating that the vehicle has arrived, the logistics robot moves to a place where the vehicle is stopped.

Appendix 8

In the delivery system described in Appendix 7,
  A delivery system, wherein the vehicle automatically loads the logistics robot into a luggage compartment when the logistics robot requiring maintenance arrives at a location of the vehicle.

Appendix 9

In the delivery system described in Appendix 8,
  The vehicle delivery system is configured to move the logistics robot to a facility capable of maintenance of the logistics robot when the logistics robot is loaded into the cargo compartment.

Appendix 10

An information processing device for managing a vehicle for package delivery and a logistics robot permanently installed in an apartment house, Acquiring information on the necessity of maintenance of the logistics robot from the logistics robot,
Transmitting information of the logistics robot requiring maintenance to the vehicle;
Instructing the vehicle to recover the logistics robot that requires maintenance;
A program that causes an operation to be executed, including:

Appendix 11

In the program described in Appendix 10,
Instructing the vehicle to carry the collected logistics robot to a facility capable of maintenance of the logistics robot, the program to execute the operation further comprising the information processing device.

Appendix 12

In the program described in Appendix 10 or 11,
The program, wherein the information of the logistics robot that needs to be maintained includes information on a location of the apartment house where the logistics robot is permanently installed and identification information of the logistics robot.

Appendix 13

A program according to any one of Appendices 10 to 12, wherein:
A non-transitory computer-readable storage medium storing a program for causing an information processing device to execute an operation that further includes: instructing a vehicle located closest to an apartment house in which the logistics robot requiring maintenance is permanently installed to collect the logistics robot.

Appendix 14

An information processing method in a delivery system including a vehicle for package delivery, a logistics robot permanently installed in a apartment house, and an information processing device,
The information processing device,
Acquiring information on the necessity of maintenance of the logistics robot from the logistics robot,
Transmitting information of the logistics robot requiring maintenance to the vehicle;
Instructing the vehicle to recover the logistics robot that requires maintenance;
An information processing method comprising:

Appendix 15

In the information processing method described in the additional remark 14, The information processing method further includes an information processing device instructing the vehicle to carry the collected logistics robot to a facility capable of maintenance of the logistics robot.

Appendix 16

In the information processing method described in Appendix 14 or 15, Information of the logistics robot that requires maintenance includes information of the location of the multi-dwelling house where the logistics robot is permanently installed, and the identification information of the logistics robot information processing method.

Appendix 17

In the information processing method according to any one of the additional remarks 14-16,
The information processing method further includes an information processing device instructing the vehicle located closest to the apartment house where the logistics robot requiring maintenance is permanently installed to collect the logistics robot.

Appendix 18

In the information processing method according to any one of the additional remarks 14 to 17,
The information processing method further includes transmitting a message indicating that the vehicle has arrived to the logistics robot when the vehicle arrives at an apartment house where the logistics robot requiring maintenance is permanently installed.

Appendix 19

In the information processing method described in the additional remark 18,
The information processing method further includes moving to a place where the vehicle is stopped when the logistics robot receives the message indicating that the vehicle has arrived.

Appendix 20

In the information processing method described in the additional remark 19, The information processing method further includes automatically loading the logistics robot into a luggage compartment when the logistics robot requiring maintenance arrives at a location of the vehicle.

What is claimed is:

1. A delivery system comprising:
an information processing device that manages a vehicle for package delivery and a logistics robot permanently installed in an apartment house, the information processing device comprising a control unit,
wherein the control unit is configured to:
acquire information on whether maintenance of the logistics robot is necessary from the logistics robot;
transmit information of the logistics robot that needs maintenance to the vehicle; and
instruct the vehicle to collect the logistics robot that needs maintenance;
a vehicle for package delivery; and
a logistics robot permanently installed in an apartment house,
wherein when the vehicle arrives at the apartment house in which the logistics robot that needs maintenance is permanently installed, the vehicle transmits a message indicating that the vehicle has arrived to the logistics robot, and
when the logistic robot receives the message indicating that the vehicle has arrived, the logistics robot moves to a location where the vehicle is stopped.
2. The deliver system according to claim 1, wherein the control unit is configured to instruct the vehicle to carry the collected logistics robot to a facility where maintenance of the logistics robot is able to be performed.

3. The deliver system according to claim 1, wherein the information of the logistics robot that needs maintenance includes information of a location of an apartment house in which the logistics robot is permanently installed and identification information of the logistics robot.

4. The deliver system according to claim 1, wherein the control unit is configured to instruct the vehicle located closest to the apartment house in which the logistics robot that needs maintenance is permanently installed to collect the logistics robot.

5. The delivery system according to claim 1, wherein when the logistics robot that needs maintenance arrives at the location of the vehicle, the vehicle automatically loads the logistics robot into a luggage compartment.

6. The delivery system according to claim 5, wherein when the vehicle loads the logistics robot into the luggage compartment, the vehicle moves to a facility where maintenance of the logistics robot is able to be performed.

7. An information processing method for a delivery system including a vehicle for package delivery, a logistics robot that is permanently installed in an apartment house, and an information processing device, the method comprising:

acquiring, by the information processing device, information on whether maintenance of the logistics robot is necessary from the logistics robot;

transmitting, by the information processing device, information of the logistics robot that needs maintenance to the vehicle;

instructing the vehicle, by the information processing device, to collect the logistics robot that needs maintenance;

transmitting, by the vehicle, a message indicating that the vehicle has arrived to the logistics robot, when the vehicle arrives at the apartment house in which the logistics robot that needs maintenance is permanently installed; and causing the logistics robot to move to a location where the vehicle is stopped when the logistics robot receives the message indicating that the vehicle has arrived.

8. The information processing method according to claim 7, further comprising instructing the vehicle, by the information processing device, to carry the collected logistics robot to a facility where maintenance of the logistics robot is able to be performed.

9. The information processing method according to claim 7, wherein the information of the logistics robot that needs maintenance includes information of a location of the apartment house in which the logistics robot is permanently installed and identification information of the logistics robot.

10. The information processing method according to claim 7, further comprising instructing the vehicle located closest to the apartment house in which the logistics robot that needs maintenance is permanently installed, by the information processing device, to collect the logistics robot.

11. The information processing method according to claim 7, further comprising automatically loading the logistics robot into a luggage compartment by the vehicle, when the logistics robot that needs maintenance arrives at a location of the vehicle.

\* \* \* \* \*